(12) United States Patent
Yang et al.

(10) Patent No.: US 8,815,981 B2
(45) Date of Patent: Aug. 26, 2014

(54) HYBRID ORGANIC-INORGANIC NANOCOMPOSITES

(75) Inventors: Yong Yang, Hillsborough, NJ (US); Johanna Garcia de Visicaro, Lake Hopatcong, NJ (US); Robert Sheerin, North Caldwell, NJ (US)

(73) Assignee: Columbia Insurance Company, Omaha, NE (US)

( * ) Notice: Subject to any disclaimer, the term of this patent is extended or adjusted under 35 U.S.C. 154(b) by 106 days.

(21) Appl. No.: 13/583,694

(22) PCT Filed: Feb. 11, 2011

(86) PCT No.: PCT/US2011/002457
§ 371 (c)(1),
(2), (4) Date: Sep. 10, 2012

(87) PCT Pub. No.: WO2011/119265
PCT Pub. Date: Sep. 29, 2011

(65) Prior Publication Data
US 2013/0005881 A1    Jan. 3, 2013

Related U.S. Application Data

(60) Provisional application No. 61/318,059, filed on Mar. 26, 2010.

(51) Int. Cl.
*C08K 13/02* (2006.01)
*C08K 3/36* (2006.01)
*B60C 1/00* (2006.01)

(52) U.S. Cl.
CPC .. *C08K 13/02* (2013.01); *B60C 1/00* (2013.01)
USPC ............................ 523/203; 523/204; 524/493

(58) Field of Classification Search
USPC ................................. 523/202, 203; 524/493
See application file for complete search history.

(56) References Cited

U.S. PATENT DOCUMENTS

| | | | |
|---|---|---|---|
| 5,280,054 A * | 1/1994 | Sakai et al. | 523/521 |
| 5,856,379 A * | 1/1999 | Shiratsuchi et al. | 523/209 |
| 6,740,590 B1 * | 5/2004 | Yano et al. | 438/692 |
| 7,476,430 B2 * | 1/2009 | Houck et al. | 428/47 |
| 2005/0059775 A1 | 3/2005 | Cai et al. | |
| 2006/0093761 A1 | 5/2006 | Chen | |
| 2007/0238804 A1 | 10/2007 | Ho | |
| 2008/0275176 A1 * | 11/2008 | Limin et al. | 524/493 |
| 2009/0149591 A1 | 6/2009 | Yang et al. | |
| 2009/0318598 A1 | 12/2009 | Perez et al. | |

OTHER PUBLICATIONS

International Search Report and Written Opinion issued in connection with the corresponding International Application No. PCT/US2011/024575 on Apr. 20, 2011.

* cited by examiner

*Primary Examiner* — Vickey Nerangis
(74) *Attorney, Agent, or Firm* — The H.T. Than Law Group

(57) ABSTRACT

The present invention relates to a dispersion of hybrid organic-inorganic nanocomposite molecules comprising discrete inorganic silica nanoparticles that are covalently bonded to organic polymers, wherein the dispersion has a high solid content (>30% wt.) and high silica content (>35% wt.) with low coagulum (about 100-400 ppm or about 0.05% wt or less). The hybrid organic-inorganic nanocomposite is prepared by (1) hydrolyzing silane monomers at acidic conditions; (2) surface treating inorganic silica nanoparticles with silane monomers; (3) stabilizing the surface-treated inorganic silica nanoparticles with an amine stabilizer; and (4) reacting organic monomers with surface-treated inorganic silica nanoparticles.

20 Claims, 5 Drawing Sheets

HYBRID ORGANIC-INORGANIC NANOCOMPOSITES

FIELD OF THE INVENTION

Generally, the present invention relates to hybrid organic-inorganic nanocomposites, and a method for making such nanocomposites. More particularly, the present invention relates to nanocomposites comprising surface-treated inorganic nanoparticles, such as colloidal silica, that are covalently bonded to an organic polymer, such as an acrylic polymer. The nanocomposites according to this invention can advantageously be used in architectural coating applications and paint compositions.

BACKGROUND OF THE INVENTION

Hybrid nanocomposite materials are a combination of organic phase and inorganic phase molecules, wherein at least one phase is in the order of nanometers. Advantageously, hybrid materials exhibit synergistic properties, i.e., properties that are greater than the sum of the properties of each individual phase. In recent years, there has been considerable interest in the development of hybrid organic-inorganic nanocomposites that may improve the properties of paints and architectural coatings including dirt, water, and scratch resistance. Of particular interest has been the development of hybrids comprising latex polymers and nanosilica, given that silica, also known as silicon dioxide ($SiO_2$), is well-known for its mechanical strength. See Stephen Krieger et al., "Colloidal Silica-Latex Polymer Nanocomposites for High Performance Coatings," *JCT Coatings Tech.*, 26-30 (August 2008).

Different processes for combining latex polymers with nanosilica are known in the paint and architectural coating art, but each known process suffers from a deficiency, e.g., lack of adequate bonding between the organic and inorganic phases, low solid content, and low silica content. The various known methods have not been able to achieve improvements, because the art of developing nanocomposites is unpredictable. As explained by Krieger et al., "There are various methods to make silica/organic nano composites, but in order to achieve the desired improvement by adding nanoparticles, the targeted organic polymer must display specific interaction tendencies with the inorganic particles." Id. at p. 27.

One known process in the art is related in U.S. Pat. No. 6,455,219, which discloses a process for preparing a latex polymer, with colloidal silica, for use in a toner. In the process, monomers are pre-mixed with a nanosilica dispersion and the polymer is prepared through a semi-continuous process. The process yields polymer/nanosilica with a significant amount of coagulum, and forms a highly viscous and unstable product at high solid content. In addition, the emulsion polymer is not a nanocomposite because the inorganic silica particles are not covalently bonded to organic polymers.

U.S. Pat. No. 6,756,437 discloses a process of making a polymer-nanosilica dispersion by using a cationic surfactant. Specifically, the halogen-containing polymers such as polyvinyl chloride are mixed with silicates to yield polymers in which the organic and inorganic phases are not linked by covalent bonds. The process yields a product with a low solid content of about 10% wt. At high solid content, the process will form an unstable product and generate a large amount of coagulum.

U.S. Pat. No. 5,856,379 discloses a process of making a polymer comprising nanosilica particles. The nanosilica particles are treated with silane monomers at a pH around 5-6. The polymerization was carried out at the same pH conditions. The process yields unstable products, either in silica surface treatment or polymerization, that yield high content of coagulum or cause gellation of the batch.

Experiments conducted in accordance with the teachings of the prior art references discussed in the above three paragraphs show that coagulum levels are high.

U.S. Pat. Pub. No. 2004/0151910 discloses an organic-inorganic composite containing an inorganic particle having a plurality of polymer particles attached to the inorganic particle and a polymer layer encapsulating the attached polymer particles. However, the composite particles are not nano-sized, and are not formed from silane monomers.

U.S. Pat. Pub. No. 2006/0134420 relates to nanometric or mesoscopic dissymmetric particles, and to a method for preparing the same. More particularly, the particles have an inorganic part A and a spherical organic part B bound by physicochemical or covalent interactions. However, the inorganic particle content is low. The data for Example 1 of this reference indicate the initial silica concentration ranges from 0.25% to 16%.

Thus, there remains a need for a hybrid organic-inorganic nanocomposite molecules comprising discrete inorganic silica nanoparticles that are covalently bonded to organic polymers, and further comprising high solid content and high silica content with low coagulum.

SUMMARY OF THE INVENTION

The present invention concerns a hybrid organic-inorganic nanocomposite dispersion comprising discrete inorganic silica nanoparticles covalently bonded to organic polymers. The dispersion has a relatively high solid content, preferably greater than about 30% wt., and relatively low levels of coagulum, i.e., about 100 to about 400 ppm. The solid matter has a relatively high silica content, preferably greater than about 35% wt. The discrete silica nanoparticles are distributed in a substantially homogenous manner within the dispersion, and a substantial proportion of the discrete inorganic silica nanoparticles, i.e., about 95% or more, are covalently bonded to organic polymers. The unique structural design of the hybrid nanocomposites combines the flexibility of organic polymers with the mechanical strength of inorganic silica nanoparticles. The nanocomposites lead to a synergistic improvement in the performance of paints and architectural coatings, including an improvement in dirt pick-up resistance and open time.

The present invention also concerns a method for forming hybrid organic-inorganic nanocomposites comprising the steps of: (1) hydrolyzing silane monomers at acidic conditions; (2) surface treating inorganic silica nanoparticles with silane monomers; (3) stabilizing the surface-treated inorganic silica nanoparticles with an amine stabilizer; and (4) reacting organic monomers with surface-treated inorganic silica nanoparticles.

BRIEF DESCRIPTION OF THE DRAWINGS

In the accompanying drawings, which form a part of the specification and are to be read in conjunction therewith.

DETAILED DESCRIPTION OF THE INVENTION

Figure 1:
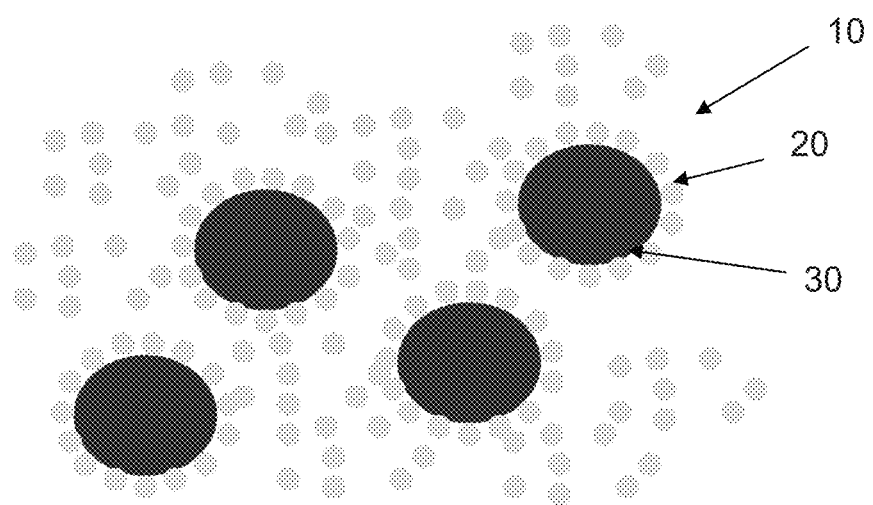
FIG. 1 is a schematic representation of hybrid organic-inorganic nanocomposites according to the present invention.

The present invention relates to a dispersion of hybrid organic-inorganic nanocomposite molecules comprising discrete inorganic silica nanoparticles that are covalently bonded to organic polymers, wherein the dispersion has a high solid content (>30% wt.) and high silica content (>35% wt.) with low coagulum (about 100-400 ppm or about 0.05% wt or less). Innovatively, the inventive hybrid organic-inorganic nanocomposite has a unique structure, wherein discrete inorganic silica nanoparticles are distributed in a substantially homogenous manner within the dispersion. Moreover, a substantial proportion of the discrete inorganic silica nanoparticles, i.e., about 95% or more, are covalently bonded to the organic polymers. This structural design synergistically combines the flexibility of organic polymers with the mechanical strength of inorganic silica nanoparticles. Consequently, the hybrid organic-inorganic nanocomposite may be used in architectural coating applications and paint compositions, with improved properties such as low dirt pick-up, longer open time, weatherability, water and chemical resistance, and scratch resistance. The hybrid organic-inorganic nanocomposite can be prepared by (1) hydrolyzing silane monomers at acidic conditions; (2) surface treating inorganic silica nanoparticles with silane monomers; (3) stabilizing the surface-treated inorganic silica nanoparticles with an amine stabilizer; and (4) reacting organic monomers with surface-treated inorganic silica nanoparticles.

As used herein the term "nanocomposite" means a "composite in which at least one of the phases has at least one dimension of the order of nanometers," as defined by the International Union of Pure and Applied Chemistry's *Compendium of Chemical Terminology* (Gold Book) (available at http://goldbook.iupac.org/NT07243.html). That dimension is less than about 100 nm, preferably less than about 50 nm, more preferably less than about 40 nm, even more preferably less than about 30 nm, and most preferably less than about 20 nm. Alternatively, the nanocomposite phase, having at least one dimension of the order of nanometers, has a mean particle size in the range of about 1 to about 100 nm, such as in the range of about 7 to about 100 nm, preferably in the range of about 1 to about 50 nm, and most preferably in the range of about 1 to about 25 nm. The term "nanoparticles" or "nanosized particles" also refers to the at least one nanocomposite phase having at least one dimension of the order of nanometers.

As used herein, the term "composite" means that two or more materials are covalently bonded. This covalent bonding is not reversible through a physical process, such as dissolving or dispersing in water or in other organic and inorganic solvents, or applying a mechanical shear. As used herein, the term "organic-inorganic composite" means that at least one inorganic material is covalently bonded to an organic material.

As used herein, the term "solid content" means the mass content of components, excluding volatile components such as solvents, that remain as residue after the composition is dried under certain conditions. As used herein, the term "silica content" means the mass content of silica, also known as silicon dioxide ($SiO_2$), in the solid matter base of a composition.

Figure 2:
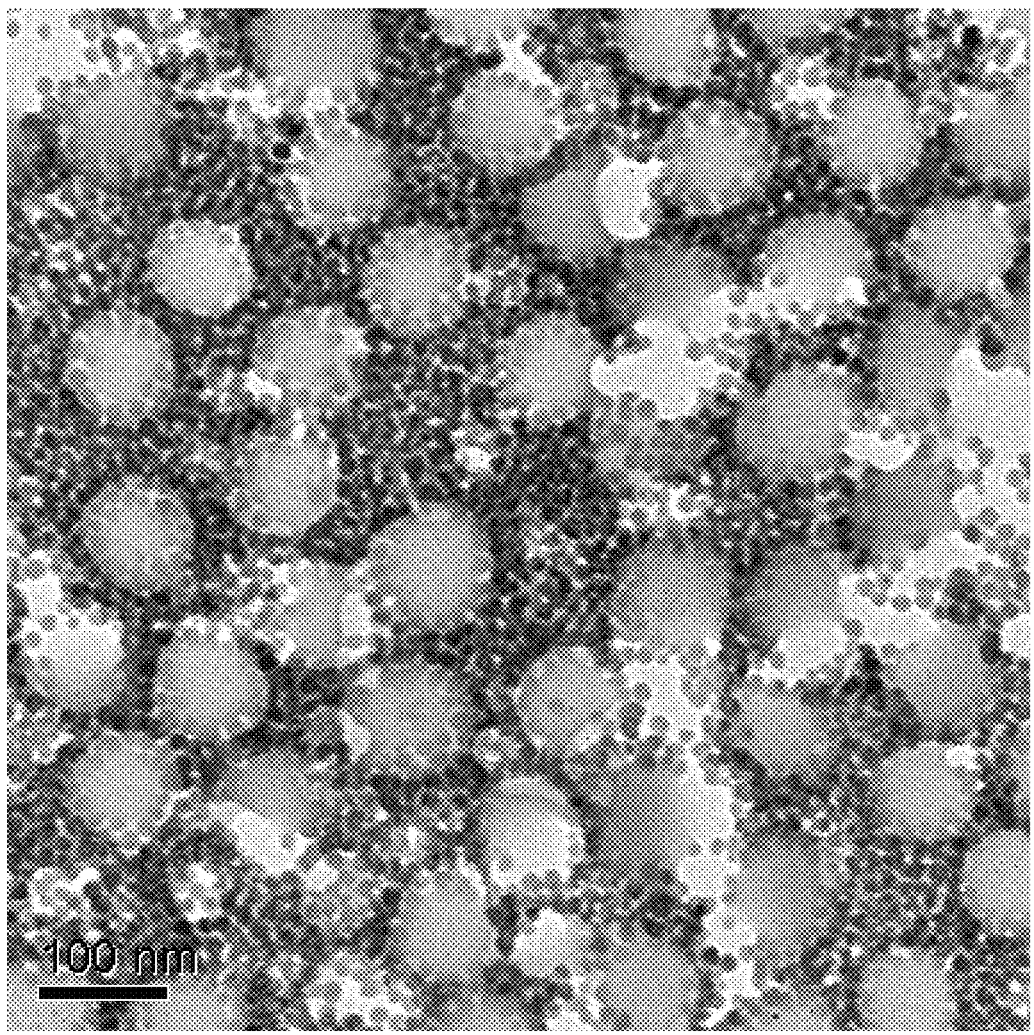
FIG. 2 is a transmission electron micrograph showing hybrid organic-inorganic nanocomposites comprising discrete silica nanoparticles having a mean size of about 10 nanometers according to the present invention.

FIG. 1 is a schematic illustration of hybrid organic-inorganic nanocomposites 10 that are formed according to this invention. The schematic representation illustrates discrete, silane monomer-treated inorganic nanoparticles 20, such as preferably spherical nanosilica, that are distributed in a substantially homogenous manner within a dispersion of organic polymer latex particles 30, such as preferably acrylic polymers. A substantial proportion of the inorganic nanoparticles 20 are covalently bonded to the organic polymer latex particles 30. The covalently bonded inorganic nanoparticles 20 are spaced in a substantially uniform manner around the circumference of each organic polymer latex particle 30. FIG. 2, which is discussed in connection with. Example 3 below, is a transmission electron micrograph that also depicts inventive hybrid organic-inorganic nanocomposites comprising surface-treated inorganic silica nanoparticles (shown in dark color) covalently bonded to organic polymers (shown in light color).

The synthesis of the inventive hybrid organic-inorganic nanocomposites may occur by a series of steps that are synopsized by Equations (1)-(3). Equation (1) illustrates the acidic hydrolysis of silane monomers, such as vinyltrimethoxysilane and methacryloylpropyltrimethoxysilane, which can be subsequently used as surface modifiers. Examples 1-3 and 5-6 below further illustrate the reaction of Equation (1).

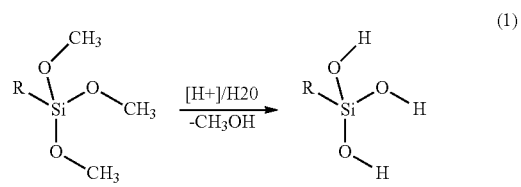

(1)

where R is

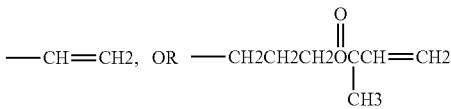

In Equation (1), silane monomers are indicated by the structure having the general formula $RSi(OCH_3)_3$, wherein the silicon atom is attached to two moieties: (i) an R group that represents an ethylenically unsaturated nonhydrolyzable organic moiety, including but not limited to alkyl, aromatic, organofunctional groups, or a combination thereof; and (ii) —$OCH_3$ that represents a particular type of alkoxy moiety, i.e., the methoxy functional group. When R is —CH=$CH_2$, the silane monomer is vinyltrimethoxysilane, and when R is

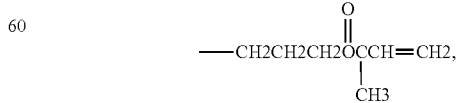

the silane monomer is methacryloylpropyltrimethoxysilane. The acid hydrolysis of the silane monomer leads to the formation of silanetriol indicated by the structure having the general formula RSi(OH)$_3$. As is generally known, acid hydrolysis is the cleaving of a molecule by water, and in Equation (1) the methoxy functional groups are cleaved resulting in hydroxyl groups. In Equation (1), acid hydrolysis is indicated by the standard notation [H+] representing acid, and H$_2$O representing a water molecule.

A variety of different silane monomers, suitable as surface modifiers, are commercially available. Silane monomers include those sold under the trade name Silquest® by Momentive Performance Materials, Inc. of Albany, N.Y. Examples of such silanes are 3-methacryloyloxypropyltrimethoxysilane (Silquest A-174NT) and vinyltri(m)ethoxysilane (Silquest A-151 and A-171) from Momentive, vinyl and olefin silanes from Gelest, Inc. such as allyltrimethoxysilane, 3-(N-styrylmethyl-2-aminoethylamino)-propyltrimethoxysilane, vinyltriacetoxylsilane, vinyltriisopropenoxysilane, vinyltris(2-methoxyethoxyl)silane, vinyltris(methylethyleketoximino)silane, allyloxyundecyltrimethoxysilane, allyloxyundecyltrimethoxysilane, allytriethoxysilane, bicycloheptenyltrimethoxysilane, butenyltriethoxysilane, docosenyltriethoxysilane, hexadecafluorododec-11-enyl-1-trimethoxysilane, hexenyltriethoxysilane, 7-octenyltrimethoxysilane, styrylethyltrimethoxysilane, 10-undecenyltrimethoxysilane, vinyltributoxysilane, divinylmethydimethoxysilane, and trivinylmethoxysilane. A suitable acid for the acid hydrolysis may include, but is not limited to, nitric acid sulfuric acid, hydrochloric acid, phosphoric acid, acetic acid, difluoroacetic acid, trifluoroacetic acid, formic acid, dichloroacetic acid, and carboxylic acid sulfuric acid, hydrochloric acid, phosphoric acid, acetic acid, difluoroacetic acid, trifluoroacetic acid, formic acid, dichloroacetic acid, and carboxylic acid Equation (2) illustrates the surface modification of colloidal nanoparticles of silica utilizing the silantriols from above. Examples 1-3 and 5-6 below further illustrate this reaction.

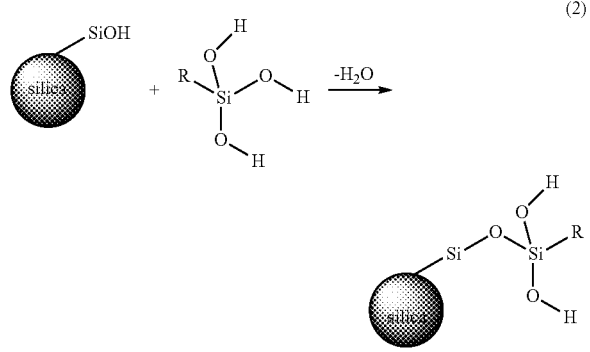

(2)

In Equation (2), the colloidal silica nanoparticles are indicated by the structure having the general formula (silica)-Si—OH. When the colloidal silica and the silantriols (indicated as RSi(OH)$_3$) are mixed, there occurs a condensation reaction leading to the formation of a surface modified silica, indicated by the structure (silica)-Si—O—Si(OH)$_2$R. As is generally known, a condensation reaction is the opposite of a hydrolysis reaction, given that two molecules are joined together with the resultant loss of water. As mentioned in the Examples, an amine stabilizer, such as 2-amino-2-methyl-1-propanol, may be added to the resulting dispersion to reduce and stabilize its viscosity. By reducing viscosity, it is believed that the inorganic nanoparticles would be distributed in substantially homogenous manner.

A variety of different colloidal silica nanoparticles are commercially available, including those sold under the trade name Ludox® by W. R. Grace & Co. of Columbia, Md., or Snowtex® by Nissan Chemical America Corporation of Houston, Tex. Different grades of commercially available Ludox® that are suitable for this invention include Ludox® AM-30, Ludox® AS-30, Ludox® AS-40, Ludox® CL, Ludox® CL-X, Ludox® HS-30, Ludox® HS-40, Ludox® LS, Ludox® SM-30, Ludox® TM-40, Ludox® TM-50, and Ludox® TMA from Sigma-Aldrich Co. The preferred grade for this invention is Ludox® AS-30. Grades of commercially available Snowtex® include Snowtex® ST-20L, ST-4, ST-50, ST-C, ST-N, ST-O, ST-OL, ST-ZL, ST-PS-M, ST-PS-MO, ST-PS-S, and ST-PS-SO.

Colloidal silica is a dispersion of nanosized silica particles in water. Most of the silica particles are dispersed in alkaline medium, which reacts with the silanol groups on the silica surface to produce negative charges. Without being bound by any theory, it is believed that because of these negative charges, silica particles repel each other, thereby providing electrostatic stabilization for the dispersion.

The stability of colloidal silica is an important factor in the preparation of organic-inorganic hybrid nanocomposites. The instability of colloidal silica may cause nanocomposites to be coagulated or gelled. Nanosilica particles are constantly moving in a liquid medium, i.e., colliding and separating from each other. Any chemical or physical shifts in this liquid medium may change the balance of particle movements, thereby resulting in coagulation or gelation. The stability of colloidal silica depends on variables such as pH, particle size and surface area, silica content, and additives. Colloidal silica with a higher concentration and smaller particle size has less stability.

Figure 3:
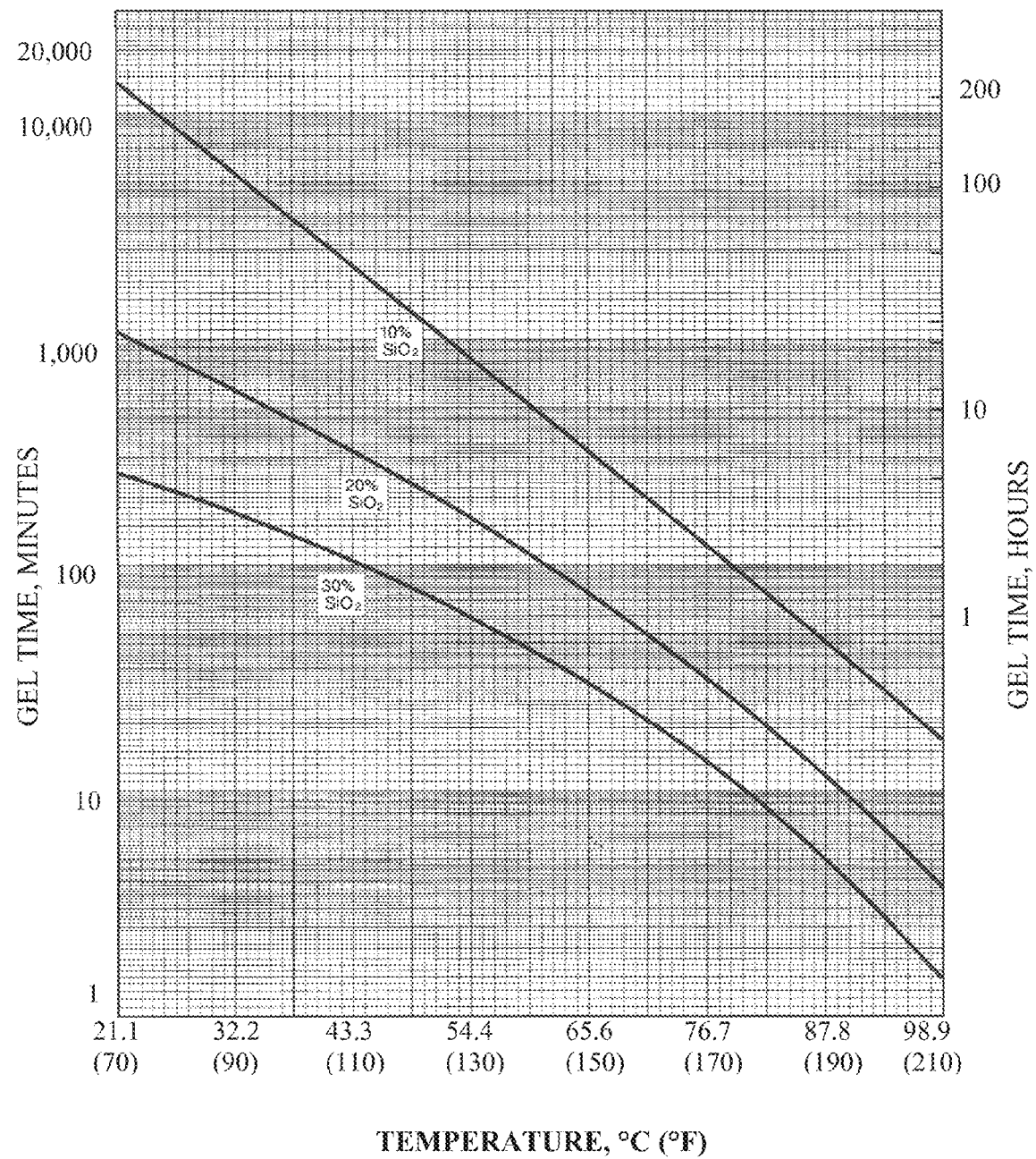
FIG. 3 is a graph illustrating the effect of temperature on gel time.

Temperature is also an important factor that influences the stability of colloidal silica during the polymerization of organic polymers. As shown in FIG. 3, colloidal silica with about 20% silica content at a pH of about 5.0 is stable at room temperature (about 70° F.) for at least about 1000 minutes, but it will gel in less than about 4 minutes at about 210° F.

Conventional emulsion polymerization is carried out at about 179° F. (about 80° C.) and the reaction occurs over a few hours. However, when preparing nanocomposites with small silica particles (about 12 nm or below) and high silica and total solid content, it is advantageous to polymerize at lower temperatures, i.e., less than about 70° C., preferably less than about 65° C., and most preferably less than about 60° C. Moreover, in the present invention, in addition to a conventional initiator such as ammonium persulfate, a second co-initiator, typically a reducing agent such as ascorbic acid, is added for polymerization. The reducing agent effectively reduces the polymerization temperature to about 52C.° to about 54° C. and therefore improves the stability of colloidal silica and nanocomposites.

Although spherical nanoparticles of silica are preferably used in the present invention, other inorganic nanoparticles may also be used to form hybrid organic-inorganic nanocomposites including, but not limited to, oxides of aluminum, zirconium, titanium, and zinc. Moreover, the shape of nanoparticles may be non-spherical including, but not limited to, globular, hollow, and oval shapes.

Examples of amine stabilizers, which also qualify as pH adjustors, that are useful for the invention include, but are not limited to, ammonium hydroxide, sodium hydroxide, sodium carbonate, sodium bicarbonate, potassium hydroxide, potassium carbonate, potassium bicarbonate, ammonium salts, ammonia, mono-, di-, tri-, and tert-amines, aminoalcohols (e.g., 2-amino-2-methyl-1-propanol and/or those compounds sold under the trade name AMP™ 95 by Angus Chemical Company of Buffalo Grove, Ill.), ethoxylated amines, and the like, and combinations thereof.

Equation (3) illustrates the reaction of surface modified silica with acrylic monomers, such as methyl methacrylate ("MMA") and 2-ethylhexylacrylate ("2EHA"), resulting in hybrid composites of inorganic colloidal silica nanoparticles that are covalently bonded to organic (co)polymers.

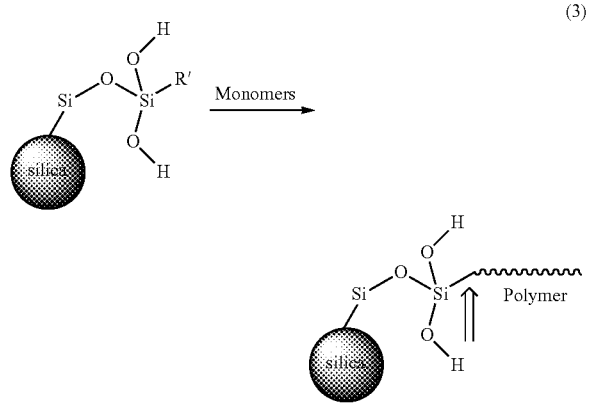

(3)

Where R' is an ethylenically unsaturated organic moiety, including but not limited to alkyl, aromatic, organofunctional groups, or a combination thereof.

In Equation (3), covalent bonding between inorganic nanoparticles and organic polymers is formed by polymerization of ethylenically unsaturated silane monomers on silica surface with organic monomers. The up arrow on the right hand side of Equation (3) indicates the location of the covalent bond. Generally, a covalent bond is a predominantly irreversible bond having a strength of about 350 kJ/mol, and thus it is one of the strongest chemical bonds. See Guido Kickelbick (Ed.), *Hybrid Materials: Synthesis, Characterization, and Applications,* 2007, pp. 3-5. Because of its strong covalent bonding, the inventive nanoncomposite may be classified as Class II hybrid material, which is defined as one that shows strong chemical interactions between its components, rather than a Class I hybrid material, which is defined as one that shows "weak interactions between the two phases, such as van der Waals, hydrogen bonding or weak electrostatic interactions." Id. at p. 4. In the present invention, strong covalent bonding would allow inorganic silica to remain attached to an organic latex polymer instead of self-coagulating. Without being bound to any theory, it is believed that such stable attachment of inorganic silica to organic polymer latex particles effectively changes polymer surface properties, thereby leading to improvements in the properties of paints and architectural coatings.

Examples 3 and 5-6 below further illustrate the reaction of Equation (3). Example 3 illustrates the reaction of surface modified silica with MMA and methacrylic acid ("MAA"), whereas Examples 5-6 illustrate the reaction of surface modified silica with both MMA and 2EHA as well as MAA in a preferred ratio of about 1.00 (MMA): 1.02 (2EHA): 0.02 (MAA). As discussed in Examples 3 and 5-6, the emulsion polymerization occurs by a batch process.

From the above, it can be seen that in a preferred embodiment, the organic polymer phase of the inventive nanocomposite is acrylic, vinyl, or styrenated. The (co)polymer compositions are made from monomers selected from the group consisting of alkyl acrylates, alkyl alkacrylates, acrylic acid, ionic acrylate salts, alkacrylic acids, ionic alkacrylate salts, acrylamide, alkacrylamides, monoalkyl acrylamides, monoalkyl alkacrylamides, acrylonitrile, alkacrylonitriles, substituted versions thereof (e.g., hydroxyalkyl acrylates, hydroxyalkyl alkacrylates, alkacrylamidoalkyl ethyleneureas, alkenyloxyamidoalkyl ethyleneureas, and the like), styrene, styrene-acrylic, vinyl acetate, and the like, and combinations thereof.

As further noted in Examples 3-7 below, the polymerization of the organic phase of the inventive nanocomposites occurs in a system comprising water, surfactant, the desired monomer(s), surface modified inorganic nanoparticles, an initiator, optionally a chaser agent, and optionally a pH adjustor.

Examples of surfactants useful in the compositions according to the invention can include, but are not limited to, non-ionic and/or anionic surfactants such as ammonium nonoxynol-4 sulfate, alkylphenol ethoxylate, such as nonylphenol ethoxylate and octylphenol ethoxylate, sodium dodecyl sulfonate, sodium tetradecyl sulfonate, sodium hexadecyl sulfonate, polyether phosphate esters, alcohol ethoxylate phosphate esters, those compounds sold under the trade name Triton™ (e.g., QS series, CF series, X series, and the like), those compounds sold under the trade name Igepal™, those compounds sold under the trade name Rhodapon™, those sold under the trade name Rhodapex™, those compounds sold under the trade name Rhodacal™, those compounds sold under the trade name Rhodafac™, and the like, and combinations thereof.

Examples of initiators and chaser solutions useful in the compositions according to the invention can include, but are not limited to, ammonium persulfate, sodium persulfate, redox systems such as sodium hydroxymethanesulfinate (sodium formaldehyde sulfoxylate; reducer) and t-butyl-hydroperoxide (oxidizer), and the like, and combinations thereof, typically in an aqueous solution. Either or both of these components can optionally contain an additional surfactant and/or a pH adjustor, if desired to stabilize the emulsion.

The inventive hybrid organic-inorganic nanocomposites, described above in Equations (1)-(3) and shown in FIGS. 1 and 2, are structurally different from conventional hybrid organic-inorganic structures. The unique structural design of the inventive hybrid organic-inorganic nanocomposites synergistically combines the advantages of organic polymers, e.g., flexibility, with the advantages of inorganic silica, e.g., mechanical strength and scrub resistance.

Figure 4:
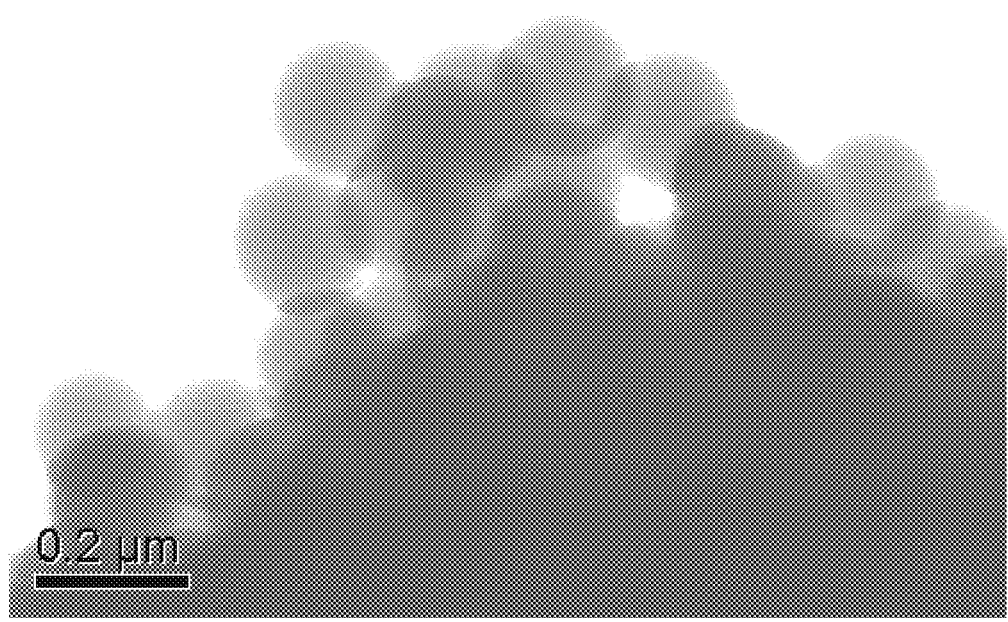
FIG. 4 is a transmission electron micrograph showing a comparative structure with no presence of silica nanoparticles.
Figure 5:
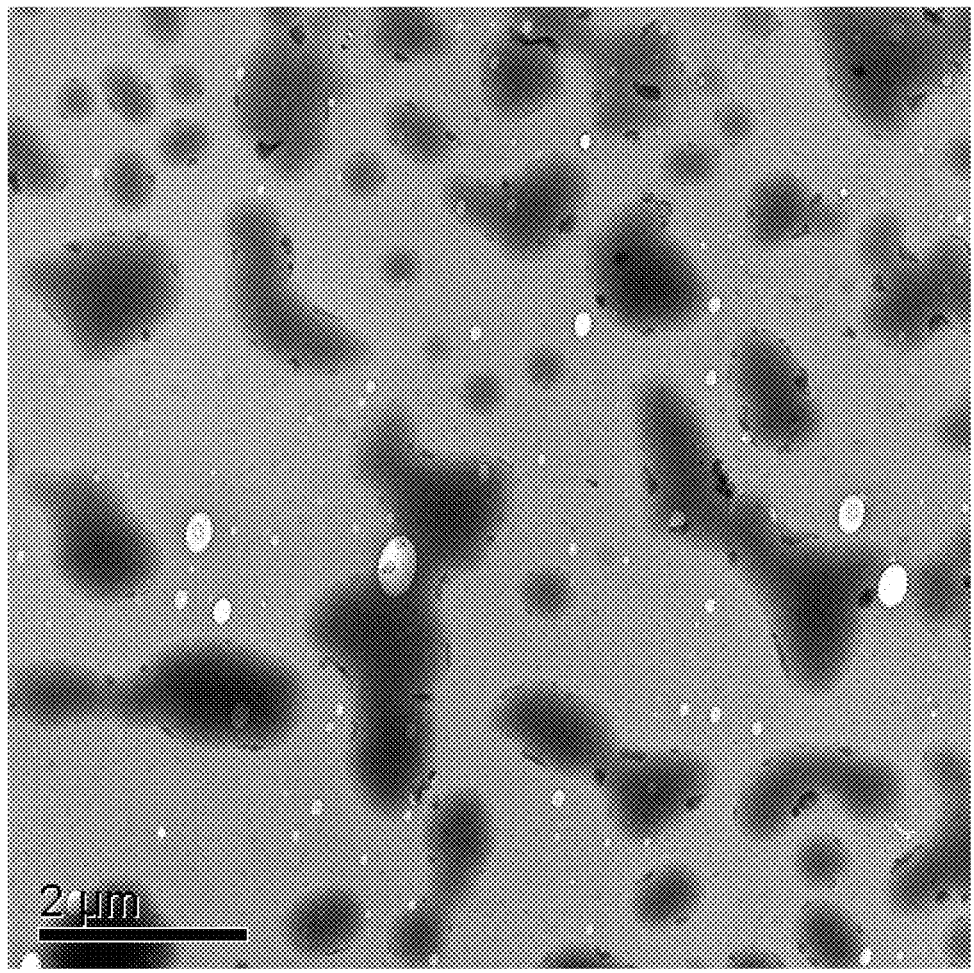
FIG. 5 is a transmission electron micrograph showing another comparative structure comprising silica particles having a mean size of about 1-2 micrometers but indicating no presence of silica nanoparticles.

FIGS. 4 and 5 describe conventional structures. FIG. 4, which is discussed in connection with Example 4 below, is a transmission electron micrograph showing the smooth surface of polymer latex particles, having a size in the order of micrometers, with no detectable presence of silica nanoparticles. FIG. 5 is a transmission electron micrograph of Celvolit® Nano 9420, an organic-nanosilica composite commercially available from Celanese Corporation of Dallas, Tex. Silica particles are shown in dark color and organic polymer latex particles are shown in light color. Unlike the inventive nanocomposite, the micrograph of the comparative composite does not show any silica particles below 100 nm, but the silica particles have a size faun about 1 to about 2 μm, thus indicating coagulation of nanosilica particles.

Unlike conventional structures shown in FIGS. 4 and 5, the inventive nanocomposite dispersion has a stable high solid content (greater than about 30% wt), and high silica content (greater than about 35% wt in the solid matter base) with low levels of undesirable coagulum (about 100-400 ppm or about 0.05% wt or less). Moreover, the inorganic silica is distributed in a substantially homogenous manner, wherein a substantial proportion of the inorganic silica is covalently bonded to the organic polymers. Such properties are beneficial when the nanocomposite is used to formulate architectural coatings or paint compositions. A high solid content is advantageous because, among other things, it leads to the formation of a harder film. A high silica content is advantageous because, among other things, it may lead to improved dirt pick-up resistance and open time. More specifically, the high solid content can range from about 30% to about 60% wt, preferably about 40% to about 60% wt, or more preferably about 50% to about 60% wt. Within the solid matter base content, the inorganic silica nanoparticle content can range from about 5% to about 60% wt and the organic polymer latex particle content can range from about 40% to about 95% wt. Preferably the inorganic content is a high silica content, ranging from about 35% to about 60% wt, preferably about 40% to about 60% wt, more preferably about 45% to about 60% wt, even more preferably about 50% to about 60% wt, and most preferably about 55% to about 60% wt. A substantial proportion of the inorganic silica nanoparticles are covalently bonded to the organic polymers, i.e., at least about 95%, preferably at least about 97%, more preferably at least about 99.9%, and most preferably all (about 100%) of the silica nanoparticles are covalently bonded. Accordingly, there are low levels of coagulum, such as about 100-400 ppm, preferably about 100-300 ppm, and more preferably about 100-200 ppm, or less than about 0.05% wt, preferably less than about 0.025% wt, more preferably less than about 0.01%, and most preferably about 0% wt.

Without being bound by any theory, it is believed that such covalent bonding of silica nanoparticles with organic polymers changes the surface properties of the organic polymers, thereby leading to improved properties such as improved dirt pick-up resistance and open time performance, which are discussed further in Example 7 below. For instance, without being bound to any theory, it is believed that the covalent bonding of the silica nanoparticles increases the steric hindrance of the organic polymers, thereby prolonging the "open time," which is defined as the time interval during which freshly applied paint can be blended with subsequently applied paint without the appearance of lack of uniformity. This manner of improving open time also helps minimize the addition of harmful volatile organic compounds (VOCs) such as polyethylene glycol and polypropylene glycol, which are conventionally used to improve the open time of aqueous paint compositions. Changes in polymer surface properties are also believed to improve dirt pick-up resistance as well as other properties including weatherability, water and chemical resistance, and scratch resistance.

The hybrid organic-inorganic nanocomposites, described above, can be included as latex particles in a paint or other coating composition, which can be an emulsion further containing water, a coalescence solvent, a pH adjustor, a surfactant, a defoamer, a pigment, optionally but preferably a dispersant, optionally but preferably a rheology modifier, and optionally but preferably a biocide or preservative.

Examples of coalescence solvents and organic solvents useful in the paint compositions according to the invention can include, but are not limited to, 2-ethylhexyl ether of ethylene glycol (e.g., commercially available as Eastman™ EEH solvent), methyl carbitol, propylene glycol, ethylene glycol, those compounds sold under the trade name TEXANOL™, plasticizers such as dibutyl phthalate, and the like, and combinations thereof.

Examples of defoamers useful in the compositions according to the invention can include, but are not limited to, polysiloxane-polyether copolymers such as those sold by Tego under the trade name Foamex™, those sold under the trade name BYK™, those sold under the trade name Drewplus™, those sold under the trade name Surfynol™, and the like, and combinations thereof.

Examples of dispersants useful in the compositions according to the invention can include, but are not limited to, 2-amino-2-methyl-1-propanol, hydrophobic copolymers such as Tamol™ 165A, carboxylated polyelectrolyte salts such as Tamol™ 731A, and the like, and combinations thereof.

Examples of rheology modifiers useful in the compositions according to the invention can include, but are not limited to, hydrophobically modified urethane rheology modifiers, hydrophobically modified polyether rheology modifiers, alkali swellable (or soluble) emulsions, hydrophobically modified alkali swellable (or soluble) emulsions, cellulosic or hydrophobically modified cellulosic rheology modifiers. Examples are those available from Rohm & Haas under the trade name Acrysol™, such as RM-8W, RM-825, RM-5000, RM-2020 NPR and RM-825, RM-5, TT-935, and Natrasol™, Natrasol Plus™ and Aquaflow™ from Aqualon Division of Hercules Inc, and UCAR Polyphobe™ from Dow.

Examples of biocides/preservatives useful in the compositions according to the invention can include, but are not limited to, hydroxy-functional aza-dioxabicyclo compounds such as those commercially available from ISP under the trade name Nuosept™ 95, those compounds sold under the trade name SKANE™, isothiazolones such as those sold under the trade name Kathon™, Polyphase™ additives from Troy Corp. and the like, and combinations thereof.

While typically multiple pigments/colorants are present in paint compositions sometimes only a white pigment, such as a zinc oxide and/or a titanium oxide, is added in the early stages of the formation of the paint composition (e.g., in the base composition). In such a case, any other desired pigments/colorants of various colors (including more white pigment) can optionally be added at the later stages of, or after, formation of the paint composition.

Examples of pigments/colorants useful according to the invention can include, but are not limited to, carbon black, iron oxide black, iron oxide yellow, iron oxide red, iron oxide brown, organic red pigments, including quinacridone red and metallized and non-metallized azo reds (e.g., lithols, lithol rubine, toluidine red, naphthol red), phthalocyanine blue, phthalocyanine green, mono- or di-arylide yellow, benzimidazolone yellow, heterocyclic yellow, DAN orange, quinacridone magenta, quinacridone violet, and the like, and any combination thereof. These exemplary color pigments can be added as powders, but can more conveniently be added as aqueous dispersions to paint compositions according to the invention.

Additionally or alternately, opacifying/extender pigments can be added, e.g., to the grind composition portion of the paint composition. Such opacifying/extender pigments generally provide background color to the compositions and thus can be used to minimize colorant costs and/or modify or enhance certain properties of the coating composition (such as hiding power, abrasion resistance, washability, scrubability, absorption (or permeability into the substrate), and drying time). Examples of opacifying/extender pigments useful in the paint compositions according to the invention can include, but are not limited to, nepheline syenites, silica (silicon dioxide), silicates including without limitation talc (magnesium silicate) and clays (aluminum silicate) such as calcined kaolin clays and delaminated kaolin clays, calcium carbonate in both the ground and precipitated forms, aluminum oxide, magnesium oxide, sodium oxide, potassium oxide, barytes (barium sulfate), zinc sulfite, gypsums (i.e., hydrated calcium sulphates), micas, lithophones, wallastonites, and bismuth oxychlorides, and the like. Further discussion of opacifying/extender pigments can be found in U.S. Pat. No. 6,638,998 and U.S. Patent Publication No. 2007/0116879, which are incorporated herein by reference in their entireties.

Titanium dioxide is a good reflector of light and provides the coating compositions with improved hiding power. Suitable titanium dioxides are available under the TI-PURE® (DuPont Company, Wilmington, Del.), TIONA® (Millennium Chemicals, Maryland), TRONOX® (Tronox Incorporated, Oklahoma), TIONA® TR-90 and TRONOX® CR-826.

EXAMPLES

The following Examples are merely illustrative of certain embodiments of the invention. The following Examples are not meant to limit the scope and breadth of the present invention, as recited in the appended claims.

Example 1

Reacting Silica Nanoparticles with Trimethoxyvinylsilane

Example 1 concerns reactions, as described above in Equations (1) and (2), which lead to the surface modification of colloidal silica with trimethoxyvinylsilane. The reactions are carried out in a four-neck flask under nitrogen purge. The flask is equipped with a condenser, a thermometer, an agitator and a feeding pump. The flask is immersed in a water bath with a temperature control within about 0.1° C.

In a first reaction, described above in Equation (1), a quantity of 89.8 grams of Ludox® A30 (commercially available from W. R. Grace & Co. of Columbia, Md.), containing a dispersion of 30 wt. % silica nanoparticles having an average particle size of about 12 nm, were added to the reaction flask. With the agitator on, 6.2 grams of nitric acid, $HNO_3$, (2.3M) were drop-wise added to the flask to adjust the pH to below about 3. The solution was heated to about 60° C.

In a separate beaker, about 3.0 grams of water, 0.3 grams of $HNO_3$ (2.3M), and 0.6 grams of trimethoxyvinylsilane (commercially available as Silquest® A-171 from Momentive Performance Materials, Inc. of Albany, N.Y.) were mixed with a magnetic stirrer for about 5 minutes. The solution was charged to the reaction flask and was kept at about 60° C. for about 2 hours, thereby facilitating a second reaction described above in Equation (2). The solution was then cooled to room temperature. The total batch size was about 100 grams with 27.5% w/w nanosilica particles surfaced modified with trimethoxyvinylsilane (also known as vinyltrimethoxysilane).

Example 2

Reacting Silica Nanoparticles with 3-Methacryloxypropyltrimethoxysilane

Example 2 also concerns reactions, as described above in Equations (1) and (2), which lead to the surface modification of colloidal silica with 3-methacryloxypropyltrimethoxysilane. In a first reaction, described above in Equation (1), a quantity of 40.6 grams of Ludox AS-30, 39.5 grams of deionized water, 1.9 grams of RHODAPEX® CO-436 (an anionic surfactant), and 2.7 grams of nitric acid, $HNO_3$, (2.3M) were mixed and heated to about 60° C. In a second reaction, described above in Equation (2), a quantity of 2.2 grams of 3-methacryloxypropyltrimethoxysilane (commercially available as Silquest® A-174NT from Momentive Performance Materials, Inc. of Albany, N.Y.) was added to the mixture and kept at about 60° C. for 2 hours. The total batch size was about 100 grams with 16.6% w/w nanosilica particles surfaced modified with 3-methacryloxypropyltrimethoxysilane. The 3-methacryloxypropyltrimethoxysilane modified silica nanoparticle dispersion was a liquid that developed a viscous fluid overnight. A quantity of 4.5 grams of 2-amino-2-methyl-1-propanol (an amine stabilizer) was added to reduce and stabilize its viscosity.

Example 3

Preparation of a Hybrid Silica-Organic Polymer Nanocomposites through a Batch Process Example 3 concerns the reaction of surface modified silica nanoparticles with organic monomers in the presence of an amine stabilizer, as described above in Equation (3). The emulsion polymerization was performed in the same equipment as in Example 1. Preliminary, in the reaction flask, 52.2 grams of the solution from Example 1 was mixed with 20.1 grams of deionized water, and 8 grams of 2-amino-2-methyl-1-propanol (an amine stabilizer). The solution was heated to about 60° C.

In a separate flask, a monomer emulsion was prepared by mixing 5.2 grams of water, 0.6 grams of RHODAPEX® CO-436 (an anionic surfactant), 13.6 grams of methyl methacrylate monomer, 0.1 gram of methacrylic acid monomer, and 0.1 gram of ammonium persulfate (an initiator). The emulsion was mixed with a magnetic stirrer until a stable emulsion was obtained.

The monomer emulsion was charged to the reaction flask, and the reaction was kept at about 60° C. for about 2 hours, thereby facilitating the polymerization reaction described in Equation (3). The resultant hybrid emulsion polymer was cooled to room temperature and filtered with a 200-mesh (74 micron) screen. Only a trace amount of grit was detected. The polymer was stable at room temperature for over about a year. The total batch size is about 100 grams. This hybrid latex polymer has a solid content of about 29% wt with about 50% wt of nanosilica particles in the solids. The particle size of the hybrid polymer is about 70 nm to about 300 nm, preferably about 70 to about 200 nm, such as about 111 nanometers, and more preferably about 70 to about 100 nm.

Example 4 (Comparative Example)

Emulsion Polymerization with Un-Modified Silica Nanoparticles

Comparative Example 4 describes the preparation of a silica nanoparticle/polymer dispersion prepared, wherein there is no surface modification of the silica nanoparticles. The emulsion polymerization was performed in the same four-neck flask as above. The silica nanoparticle dispersion Ludox® TMA (commercially available from W. R. Grace & Co. of Columbia, Md.) contained a dispersion of 34 wt. % silica nanoparticles having an average particle size of about 22 nanometers. A quantity of 8.3 grams of Ludox® TMA was added to the reaction flask along with 27.5 grams of deionized water, 0.3 grams of Rhodapex® EST-30 (an anionic surfactant commercially available from Rhodia-Novecare), 0.4 grams of Igepal® CA-897 (a nonionic surfactant commercially available from Rhodia-Novecare), and about 0.1 grams of ammonia hydroxide solution (29.4% in $H_2O$). The reactor was heated to about 60° C.

In a separate flask, a monomer emulsion was prepared by mixing 1.1 grams of Rhodapex® EST-30, 0.4 grams of Igepal® CA-897, 20.4 grams of deionized water, 10.1 grams of butyl acrylate monomer, 9.8 grams of methyl methacrylate monomer, 0.1 grams of methacrylic acid monomer, and a small amount (~0.1 grams) of ammonia hydroxide (39.4% w/w) to adjust the pH to about 7.

The oxidant solution was prepared by dissolving 0.1 grams of ammonia persulfate in 12.6 grams of deionized water. The reductant solution was made by mixing 0.1 grams of sodium formaldehyde hydrosulfite in 8.8 grams of deionized water.

The polymerization started with charging the monomer emulsion, the oxidant solution, and the reductant solution to the reactor over a period of 3½ hours. After all the materials were charged, the reactor was held at about 60° C. for 30 minutes before it was cooled to room temperature. The total amount of product is about 100 grams. The polymer has solid content of about 24% w/w with about 11.7% silica nanoparticles in the solids.

Samples of Examples 3 and 4 were cleaned by dialysis through a 50 nanometer pore sized membrane to remove all surfactants and discrete nanoparticles, and were rinse multiple times with deionized water. The final collection of the samples was examined with transmission electron microscopy (TEM).

FIG. 2 is a transmission electron micrograph that depicts inventive hybrid organic-inorganic nanocomposites, formulated in Example 3, comprising surface-treated inorganic silica nanoparticles (shown in black) covalently bonded to organic polymers (shown in white). FIG. 4 is transmission electron micrograph that depicts the comparative structure, formulated in Example 4, comprising polymer latex, having a size in the order of micrometers, with no detectable presence of silica nanoparticles. Thus, unlike in FIG. 2, a substantial proportion of silica nanoparticles were not bound to polymer latex particles and were filtered out by dialysis.

Example 5

Preparation of a Hybrid Silica-Poly(meth 1 methacrylate-co-2-ethylhexylacrylate) Nanocomposites through a Batch Process Example 5 describes the preparation of hybrid organic-inorganic nanocomposites, as noted in Equations (1)-(3) above, and in a manner similar to the procedures described in Examples 1-3 above. First, colloidal silica was surface modified with trimethoxyvinylsilane. A quantity of 42.7 grams of Ludox® A30 and 2.6 grams of $HNO_3$ (2.3M) were added to a reaction flask. The solution was heated to about 60° C., thereby facilitating the reaction described in Equation (1) above.

In a separate beaker, 1.3 grams of water, 0.1 grams of $HNO_3$ (2.3M), and 0.2 grams of trimethoxyvinylsilane (Silquest A-171) was mixed with a magnetic stirrer for about 5 minutes. The solution was charged to the reaction flask and was kept at about 60° C. for about 4 hours, thereby facilitating the reaction described in Equation (2) above. The solution was then cooled to room temperature. The solution was kept at room temperature overnight. A quantity of 8.6 grams of deionized water and 5.6 grams of 2-amino-2-methyl-1-propanol were added to the reactor. It was heated to about 60° C. with agitation.

The monomer emulsion was prepared by mixing 11.5 grams of water, 0.9 grams of RHODAPEX® CO-436 (anionic surfactant), 8.6 grams of methyl methacrylate (MMA) monomer, 8.8 grams of 2-ethylhexylacrylate (2EHA) monomer, and 0.2 grams of methacrylic acid (MAA) monomer. The initiator solution was prepared by mixing 0.2 grams of ammonium persulfate with 1.7 grams of deionized water.

All of the monomer emulsion and initiator solution was charged to the reactor at once. The reactor was kept at about 60° C., thereby facilitating the reaction described in Equation (3) above. After 20 minutes, an oxidant solution of 0.1 grams t-butylhydroxyperoxide in 0.9 grams of deionized water, and a reductant solution of 0.1 grams of ascorbic acid in 0.9 grams of deionized water were gradually fed to the reactor through 30 minutes.

The final product was cooled to room temperature and filtered with a 200-mesh (74 micron) screen. This hybrid organic-inorganic nanocomposite has a solid content of 35% by weight with 40% of silica nanoparticles in the solids. The ratio of MMA/2EHA/MAA by weight in the organic polymer phase is about 1.00 (MMA): 1.02 (2EHA): 0.02 (MAA).

Example 6

Preparation of a Hybrid methacrylate-co-2-ethylhexylacrylate)

Nanocomposites through a Batch Process with 2 Stages of Monomer Feed

Example 6 describes the preparation of hybrid organic-inorganic nanocomposite particles by a batch process, as generally noted in Equations (1)-(3) above, wherein the monomer mixture is added in 2 stages. The polymerization was carried by a redox reaction.

A quantity of 46.8 grams Ludox A30 and 3.2 grams of $HNO_3$ (2.3M) was added to the reaction flask. The solution was heated to about 60° C., thereby facilitating the reaction described in Equation (1) above. In a separate beaker, 1.4 grams of water, 0.1 grams of $HNO_3$ (2.3M), and 0.5 grams of trimethoxyvinylsilane (Silquest A-171) was mixed with a magnetic stirrer for about 5 minutes. The solution was charged to the reaction flask and was kept at about 60° C. for about 2½ hours, thereby facilitating the reaction described in Equation (2) above. The solution was then cooled to room temperature. The solution was kept at room temperature overnight. A quantity of about 5 grams of 2-amino-2-methyl-1-propanol was added to the reactor under agitation. It was heated to about 60° C.

A monomer emulsion with 9.8 grams of water, 2.5 grams of RHODAPEX® CO-436, 4.1 grams of methyl methacrylate monomer, 4.6 grams of 2-ethylhexylacrylate monomer, and 0.2 grams of methacrylic acid monomer was charged to reactor at once, thereby facilitating the beginning of the reaction described in Equation (3) above. A quantity of 2.1 grams of 4 wt. % ammonia persulfate solution (oxidant) and 2.1 grams of 4 wt. % sodium hydroxymethanesulfinate solution (reductant) were subsequently added to the reactor.

After about 30 minutes, a second monomer mixture of 3.5 grams of deionized water, 0.2 grams of RHODAPEX® CO-436, 4.1 grams of methyl methacrylate and 4.9 grams of 2-ethylhexylacrylate were charged to the reactor, followed by an additional 2.1 grams of 4 wt. % w/w sodium persulfate solution and 2.1 grams of 4 wt. % w/w ammonia hydroxymethanesulfinate solution. The polymerization, noted in Equation (3) above, was kept for another one hour before it was cooled to room temperature.

The nanocomposite product was filtered with a 200-mesh (74 micron) screen and was measured to have a solid content of 37.5 wt. % with 51 wt. % of silica nanoparticles in the solids.

Example 7

Paint Compositions Made with Hybrid and Conventional Polymers

Examples 7A and 7B, synopsized in Table 1 below, respectively describe paint compositions formulated using inventive hybrid nanocomposites and comparative polymers. More specifically, in Example 7A, a paint composition was formulated by blending the hybrid organic-inorganic nanocomposite of Example 5 with a conventional polymer. Such a blend further increases the solid content of the composition, leading to a harder film. In Example 7B, a paint composition was formulated using only a conventional polymer. The conventional polymers, which are used in both Examples 7A and 7B, have the same weight ratio of constituent monomers as the organic polymer phase of the nanocomposite of Example 5, i.e., methylmethacrylate (MMA), 2-ethylhexylacrylate (2EHA) and methacrylic acid (MAA) have a weight ratio of about 1.00 (MMA): 1.02 (2EHA): 0.02 (MMA), but are not reacted with surface modified silica.

fly-ash and water at 1:1 ratio by weight. A 3 mil drawdown of fly ash slurry was applied on the dried paint drawdown, with half of the dried paint drawdown covered. The slurry was allowed to dry for three hours and a soft brush was used to remove excess ash from the paint surface. The colorimetric L a*b* values (corresponding to the dimensions of lightness (L), redness/greenness (a) and yellowness/blueness (b) in the CIELAB perceptual color space system) of the uncovered surface were measured with a spectrophotometer and were compared to the colorimetric values of the uncovered surface to obtain a Delta E color difference value. A lower Delta E value indicates less dirt pick-up. The results are shown in Table 2 below. Further information about the L a*b* system and the calculation of Delta E values can be found in commonly owned, co-pending U.S. patent application Ser. No. 12/380,697, which is incorporated herein by reference in its entirety.

Open time performance was measured as follows. For both Example 7A and 7B, a paint drawdown was made with a 5-mil Dow bar on a black sealed chart. Starting from the top

TABLE 1

| Ingredients | Example 7A Amount (pounds) | Example 7B Amount (pounds) |
|---|---|---|
| Water | 35.1 | 45.0 |
| KATHON ® LX 1.5% (biocide, commercially available from Rhom and Haas Company) | 0.5 | 0.5 |
| TAMOL ® 1124 (dispersant, commercially available from Rhom and Haas Company) | 6.0 | 6.0 |
| IGEPAL ® CO-630 (surfactant, commercially available from Rhodia Novecare) | 1.0 | 1.0 |
| STRODEX ® LFK-70 (surfactant, commercially available from Ashland, Inc.) | 2.0 | 2.0 |
| Zinc Oxide | 7.5 | 7.5 |
| TI-PURE ® R-706 (titanium dioxide, commercially available from E. I. du Pont de Nemours and Company) | 142.5 | 142.5 |
| ATTAGEL ® 50 (pigment, commercially available from BASF) | 2.5 | 2.5 |
| BYK-420 ® (liquid thixotropic additive, commercially available from BYK-Chemie GmbH) | 0.7 | 0.7 |
| FOAMSTAR ® A-45 (deformer, commercially available from Cognis GmbH) | 0.8 | 0.8 |
| Grind at 2200 rpm for 10 minutes, reduce rpm to 500-1000, and add the following ingredients. | | |
| WATER | 42.5 | 52.5 |
| IGEPAL ® CO-630 | 0.9 | 0.9 |
| EASTMAN ® EEH Solvent (commercially available from Eastman Chemical Company) | 3.0 | 3.0 |
| Propylene Glycol | 1.3 | 1.5 |
| SKANE ® M-8 (mildewcide, commercially available from Rhom and Haas Company) | 1.4 | 1.4 |
| OPTIFILM ® ENHANCER 400 (coalescent, commercially available from Eastman Chemical Company) | 2.0 | 3.5 |
| 2-amino-2-methyl-1-propanol | 0.0 | 0.5 |
| Hybid Organic-Inorganic Nanocomposite of Example 5 (35% solids) | 134.0 | 0.0 |
| Acrylic polymer (MMA/2EHA/MAA 1.00/1.02/0.02, 42% solids) | 134.0 | 0.0 |
| Acrylic polymer (MMA/2EHA/MAA 1.00/1.02/0.02, 48% solids) | 0.0 | 220.0 |
| ACRYSOL ® RM-5000 (thicknener, commercially available from Rhom and Haas Company) | 1.2 | 4.0 |
| WATER | 14.0 | 33.0 |
| ACRYSOL ® RM-825 (thickener, commercially available form Rohm and Haas Company) | 0.3 | 1.2 |
| BYK-022 ® (defoamer, commercially available from BYK-Chemie GmbH) | 3.0 | 3.0 |

The paints of Examples 7A and 7B were tested for dirt pick-up resistance and open time performance. A dirt pick-up test was performed by applying paint samples on a 3 mil Leneta drawdown card, which was then dried at room temperature for 7 days. A slurry of fly ash was prepared by mixing of the drawdown, the paint was brushed from left to right and back for 5 times at natural rate. For each 30 second interval, the paint was brushed again under the previous brush area and a visual examination of the drawdown brush-in and repair performance was measured. The open time was recorded as the maximum time at which the marks on the drawdowns were brushed-in or repaired. The results are shown in Table 2.

TABLE 2

Evaluation of Paints from Examples 7A and 7B

|  | Example 7A | Example 7B |
|---|---|---|
| Dirt Pick-up (FMC II Delta E) | 2.65 | 8.12 |
| Open Time (Minutes) | 8.50 | 3 |

The results, from Table 2 above, demonstrate that paint made with hybrid silica nanoparticle polymer composite improves dirt pick-up resistance and open time. More particularly, one can note that both dirt pick-up resistance and open time are improved by a factor of about 3.

Example 8

Determination of Nanosilica Content in Hybrid Nanocomposites

A sample of hybrid organic-inorganic nanocomposites was prepared in a manner similar to the procedure described above in Examples 1-3. In a first reaction, described above in Equation (1), a quantity of 84.6 grams of Ludox® A30 and a quantity of 5.8 grams of nitric acid, $HNO_3$, (2.3M) were mixed in a reaction flask. The solution was heated to about 60° C. Subsequently, a mixture of 2.5 grams of deionized water, 0.8 grams of trimethoxyvinylsilane (Silquest® 171) and 0.2 grams of $HNO_3$ (2.3M) was charged to the reaction flask and was kept at about 60° C. for about 2 hours, thereby facilitating the reaction described above in Equation (2). This surface treated silica nanoparticle dispersion was cooled to room temperature and then 12.5 grams of 2-amino-2-methyl-1-propanol was charged to the reactor.

A monomer emulsion, comprising a mixture of 21 grams of water, 4 grams of RHODAPEX® CO-436 (an anionic surfactant), 11 grams of methyl methacrylate (MMA) monomer, and 13 grams of 2-ethylhexyl acrylate (2EHA) monomer, was charged to the reaction flask at about 60° C. at once. Subsequently, an oxidant solution, comprising a mixture of 0.1 grams of ammonium persulfate and 2.5 grams of deionized water, was added to reactor followed by a reductant solution, comprising a mixture of 0.1 gram of sodium formaldehyde hydrosulfite and 2.5 grams of deionized water. The reactor flask was kept at about 60° C. for about 2 hours, thereby facilitating the reaction of equation (3), and then it was cooled to room temperature. The resulting product is stable for at least about one month on the bench.

The hybrid nanocomposite has a solid content of about 35% wt. The calculated silica content based on ingredients added is 50.4% w/w of the total hybrid nanocomposite.

In order to determine the amount of silica particles bonded to organic polymer latex particles, the free silica particles, surfactants and other additives were removed. These components were removed by dialysis using a polycarbonate filter with 50 nm pore size. Because the particle size of Ludox® A30 is about 12 nanometers, any possible free silica particles would be removed from the sample by dialysis.

After dialysis, the sample was dried in an oven at about 110° C. for about 2 hours to determine the total weight of solids. The dried sample was then heated in an oven at about 600° C. for about four hours. Substantially all organic polymers were degraded and evaporated. The remaining silica was weighed and determined to be about 51.4% w/w of the hybrid nanocomposite. This empirically determined silica content is about the same as the content calculated based on ingredients, indicating that substantially all silica nanoparticles are bonded to organic polymer latex particles.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s) and steps or elements from methods in accordance with the present invention can be executed or performed in any suitable order. Therefore, it will be understood that the appended claims are intended to cover all such modifications and embodiments, which would come within the spirit and scope of the present invention.

The invention claimed is:

1. A hybrid organic-inorganic nanocomposite dispersion comprising discrete inorganic silica nanoparticles covalently bonded to organic polymer latex particles, wherein the dispersion has a solid content greater than or equal to about 30% wt, wherein the solid content has a silica content greater than or equal to about 35% wt., wherein the dispersion has about 100 to about 400 ppm of coagulum, wherein the discrete silica nanoparticles are distributed in a substantially homogenous manner within the dispersion.

2. The hybrid organic-inorganic nanocomposite dispersion of claim 1, wherein the inorganic silica nanoparticles are surface treated with silane monomers selected from the group consisting of methacryloyloxypropyltrimethoxysilane, vinyltri(m)ethoxysilane, allyltrimethoxysilane, 3-(N-styrylmethyl-2-aminoethylamino)-propyltrimethoxysilane, vinyltriacetoxylsilane, vinyltriisopropenoxysilane, vinyltris(2-methoxyethoxyl)silane, vinyltris(methylethylketoximino)silane, allyloxyundecyltrimethoxysilane, allyloxyundecyltrimethoxysilane, allytriethoxysilane, bicycloheptenyltrimethoxysilane, butenyltriethoxysilane, docosenyltriethoxysilane, hexadecafluorododec-11-enyl-1-trimethoxysilane, hexenyltriethoxysilane, 7-octenyltrimethoxysilane, styrylethyltrimethoxysilane, 10-undecenyltrimethoxysilane, vinyltributoxysilane, divinylmethydimethoxysilane, and trivinylmethoxysilane.

3. The hybrid organic-inorganic nanocomposite dispersion of claim 1, wherein the organic polymer latex particles are formulated from constituent monomers selected from the group consisting of alkyl acrylates, alkyl alkacrylates, acrylic acid, ionic acrylate salts, alkacrylic acids, ionic alkacrylate salts, acrylamide, alkacrylamides, monoalkyl acrylamides, monoalkyl alkacrylamides, acrylonitrile, alkacrylonitriles, styrene, styrene-acrylic, and vinyl acetate.

4. The hybrid organic-inorganic nanocomposite dispersion of claim 1 comprising a solid content in the range of about 30% to about 60% wt.

5. The hybrid organic-inorganic nanocomposite dispersion of claim 1 comprising a solid content in the range of about 40% to about 60% wt.

6. The hybrid organic-inorganic nanocomposite dispersion of claim 1 comprising a solid content in the range of about 50% to about 60% wt.

7. The hybrid organic-inorganic nanocomposite dispersion of claim 1 wherein the solid matter has a silica content in the range of about 35% to about 60% wt.

8. The hybrid organic-inorganic nanocomposite dispersion of claim 1 wherein the solid matter has a silica content in the range of about 45% to about 60% wt.

9. The hybrid organic-inorganic nanocomposite dispersion of claim 1 wherein the solid matter has a silica content in the range of about 55% to about 60% wt.

10. The hybrid organic-inorganic nanocomposite dispersion of claim 1 wherein the dispersion has about 100 to about 300 ppm of coagulum.

11. The hybrid organic-inorganic nanocomposite dispersion of claim 1 wherein the dispersion has about 100 to about 200 ppm of coagulum.

12. The hybrid organic-inorganic nanocomposite dispersion of claim 1, wherein at least about 95% of the silica nanoparticles are covalently bonded to the organic polymer latex particles.

13. The hybrid organic-inorganic nanocomposite dispersion of claim 1 wherein at least about 97% of the silica nanoparticles are covalently bonded to the organic polymer latex particles.

14. The hybrid organic-inorganic nanocomposite dispersion of claim 1 wherein at least about 99.5% of the silica nanoparticles are covalently bonded to the organic polymer latex particles.

15. An aqueous paint composition comprising the hybrid organic-inorganic nanocomposite dispersion of claim 1, water, a coalescence solvent, a surfactant, a defoamer, and a pigment.

16. A method for forming a hybrid organic-inorganic nanocomposite dispersion, wherein the hybrid organic-inorganic nanocomposite dispersion comprises discrete inorganic silica nanoparticles covalently bonded to organic polymer latex particles, wherein the dispersion has a solid content greater than or equal to about 30% wt., wherein the solid content has a silica content greater than or equal to about 35% wt., wherein the dispersion has about 100 to about 400 ppm of coagulum, wherein the discrete silica nanoparticles are distributed in a substantially homogenous manner within the dispersion, and wherein the method comprises the steps of:
(a) hydrolyzing silane monomers at acidic conditions;
(b) surface treating inorganic silica nanoparticles with the silane monomers;
(c) stabilizing the surface-treated inorganic silica nanoparticles with an amine stabilizer; and
(d) reacting organic monomers with the surface-treated inorganic nanoparticles.

17. The hybrid organic-inorganic nancomposite dispersion of claim 1, wherein a first plurality of the discrete inorganic silica nanoparticles are covalently bonded to an outer surface of each organic polymer latex particle.

18. The hybrid organic-inorganic nanocomposite dispersion of claim 17, wherein the first plurality of discrete inorganic silica nanoparticles covalently bonded to the outer surface of each organic polymer latex particle are spaced in a substantially uniform manner around a circumference of each organic polymer latex particle.

19. The hybrid organic-inorganic nanocomposite dispersion of claim 1, wherein the mean particle size of the discrete inorganic silica nanoparticles is below 100 nm, and the particle size of hybrid polymer particles comprising the discrete inorganic silica particles covalently bonded to the organic polymer latex particle ranges from about 70 nm to about 300 nm.

20. The hybrid organic-inorganic nanocomposite dispersion of claim 19, wherein the size of each organic polymer latex particle is substantially larger than the size of each discrete inorganic silica nanoparticle.

* * * * *